(12) United States Patent
Masamoto et al.

(10) Patent No.: US 11,036,084 B2
(45) Date of Patent: Jun. 15, 2021

(54) BACKLIGHT DEVICE AND LIQUID CRYSTAL DISPLAY DEVICE COMPRISING THE SAME

(71) Applicant: Japan Display Inc., Tokyo (JP)

(72) Inventors: Taketoshi Masamoto, Tokyo (JP); Tetsuro Ochi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/934,253

(22) Filed: Jul. 21, 2020

(65) Prior Publication Data

US 2020/0348567 A1 Nov. 5, 2020

Related U.S. Application Data

(63) Continuation of application No. 16/032,378, filed on Jul. 11, 2018, now Pat. No. 10,754,192.

(30) Foreign Application Priority Data

Jul. 14, 2017 (JP) .............................. JP2017-138256

(51) Int. Cl.
*G02F 1/13357* (2006.01)
*F21V 8/00* (2006.01)
*G02F 1/133* (2006.01)
*G02F 1/1335* (2006.01)
*G02F 1/1333* (2006.01)

(52) U.S. Cl.
CPC ..... *G02F 1/133606* (2013.01); *G02B 6/0025* (2013.01); *G02F 1/13306* (2013.01); *G02F 1/133305* (2013.01); *G02F 1/133504* (2013.01); *G02F 1/133528* (2013.01); *G02F 1/133603* (2013.01); *G02F 1/133615* (2013.01)

(58) Field of Classification Search
CPC ................................................. G02F 1/133606
See application file for complete search history.

(56) References Cited

U.S. PATENT DOCUMENTS

| | | | |
|---|---|---|---|
| 2011/0096262 A1* | 4/2011 | Kikuchi | ................. G09F 9/301 349/58 |
| 2016/0291216 A1 | 10/2016 | Lee | |
| 2017/0184775 A1 | 6/2017 | Kang et al. | |
| 2018/0239082 A1* | 8/2018 | Kunimochi | ....... G02F 1/133524 |

OTHER PUBLICATIONS

Japanese Office Action dated Feb. 16, 2021 for the corresponding Japanese Patent Application No. 2017-138256, with English machine translation.

\* cited by examiner

*Primary Examiner* — Edmond C Lau
(74) *Attorney, Agent, or Firm* — Michael Best & Friedrich LLP

(57) ABSTRACT

According to one embodiment, a backlight device includes a light guide including an emission surface including a flat area and an inclined area inclined in an out-of-plane direction from an edge of the flat area, a light source emitting light into the light guide, and an optical diffusion sheet on the emission surface. The optical diffusion sheet includes a diffusion flat area overlapping the flat area of the emission surface and a diffusion inclined area overlapping the inclined area of the emission surface, and a haze of the diffusion inclined area is higher than that of the diffusion flat area.

14 Claims, 8 Drawing Sheets

BACKLIGHT DEVICE AND LIQUID CRYSTAL DISPLAY DEVICE COMPRISING THE SAME

CROSS-REFERENCE TO RELATED APPLICATIONS

The present application is a Continuation of application Ser. No. 16/032,378, filed Jul. 11, 2018, which claims priority from Japanese Patent Application No. 2017-138256, filed Jul. 14, 2017, the entire contents of which are incorporated herein by reference.

FIELD

Embodiments described herein relate generally to a backlight device and a liquid crystal display device comprising the same.

BACKGROUND

Liquid crystal display devices are widely used as a display device of smartphones, tablet computers, vehicle-navigation systems, etc. In general, a liquid crystal display device comprises a liquid crystal display panel and a planer illumination device (backlight device) overlaid on the rear surface of the liquid crystal display panel and illuminates the liquid crystal panel. The backlight device comprises a reflective layer, a light guide plate (light guide), an optical sheet (a prism sheet or a diffusion sheet), an LED as and a light source, etc. The reflective layer and the optical sheet are stacked one on another.

Meanwhile, such a liquid crystal display is proposed that the display screen is partially or entirely inclined or curved. In such a liquid crystal display device, the backlight device is also partially or entirely inclined or curved.

The viewing angle characteristics of a liquid crystal display device are dependent on the viewing angle characteristics of the backlight device. In many cases, the backlight device is adjusted so as to exhibit its maximum luminance in a normal direction to the light-emitting surface. That is, high-intensity light is emitted to a front direction in a flat region and to an oblique direction in an inclined region (curved region). Therefore, when the display screen is observed from the front direction, a significant difference in luminance is created between the flat region and the inclined region or curved region of the display screen, thereby degrading the display quality.

Here, when a high-haze diffusion sheet (in-plane uniform haze) is placed on the outermost surface of the emission face of the backlight device, frontal luminance of the inclined region increases and front luminance of the flat region decreases. In this manner, the difference in luminance between the flat region and the inclined region can be lessened to improve reduced, thereby improving the display quality. However, in this case, the luminance of the flat region decreases to degrade the commodity value itself.

DETAILED DESCRIPTION

Figure 1:
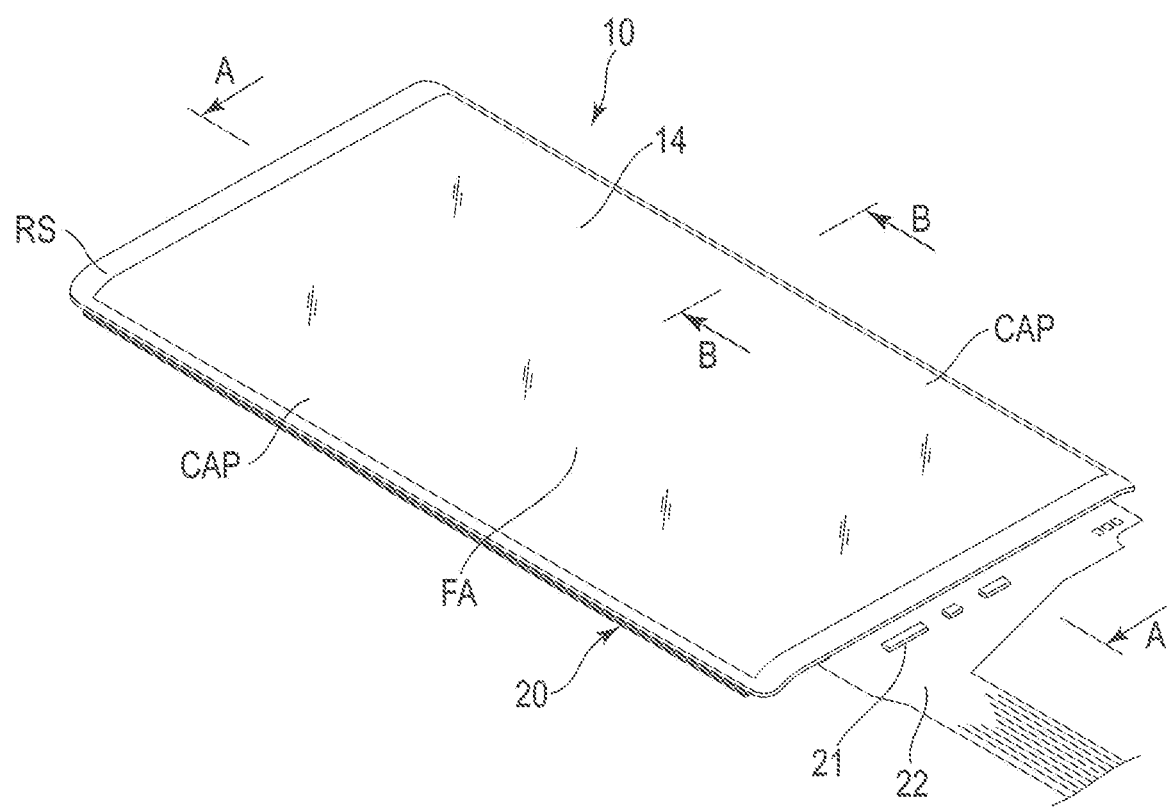
FIG. 1 is a perspective view showing a liquid crystal display device of the first embodiment from a display surface side.

Various embodiments will be described hereinafter with reference to the accompanying drawings. In general, according to one embodiment, a backlight device comprises a light guide comprising a flat area and an emission surface including an inclined area inclined in an out-of-plane direction from an edge of the flat area, a light source which emits light entering the light guide and an optical diffusion sheet disposed to be overlay on the emission surface. The optical diffusion sheet comprises a diffusion flat area overlapping the flat area of the emission surface and a diffusion inclined area overlapping the inclined area of the emission surface, and a haze of the diffusion inclined area is higher than the haze of the diffusion flat area.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

Figure 2:
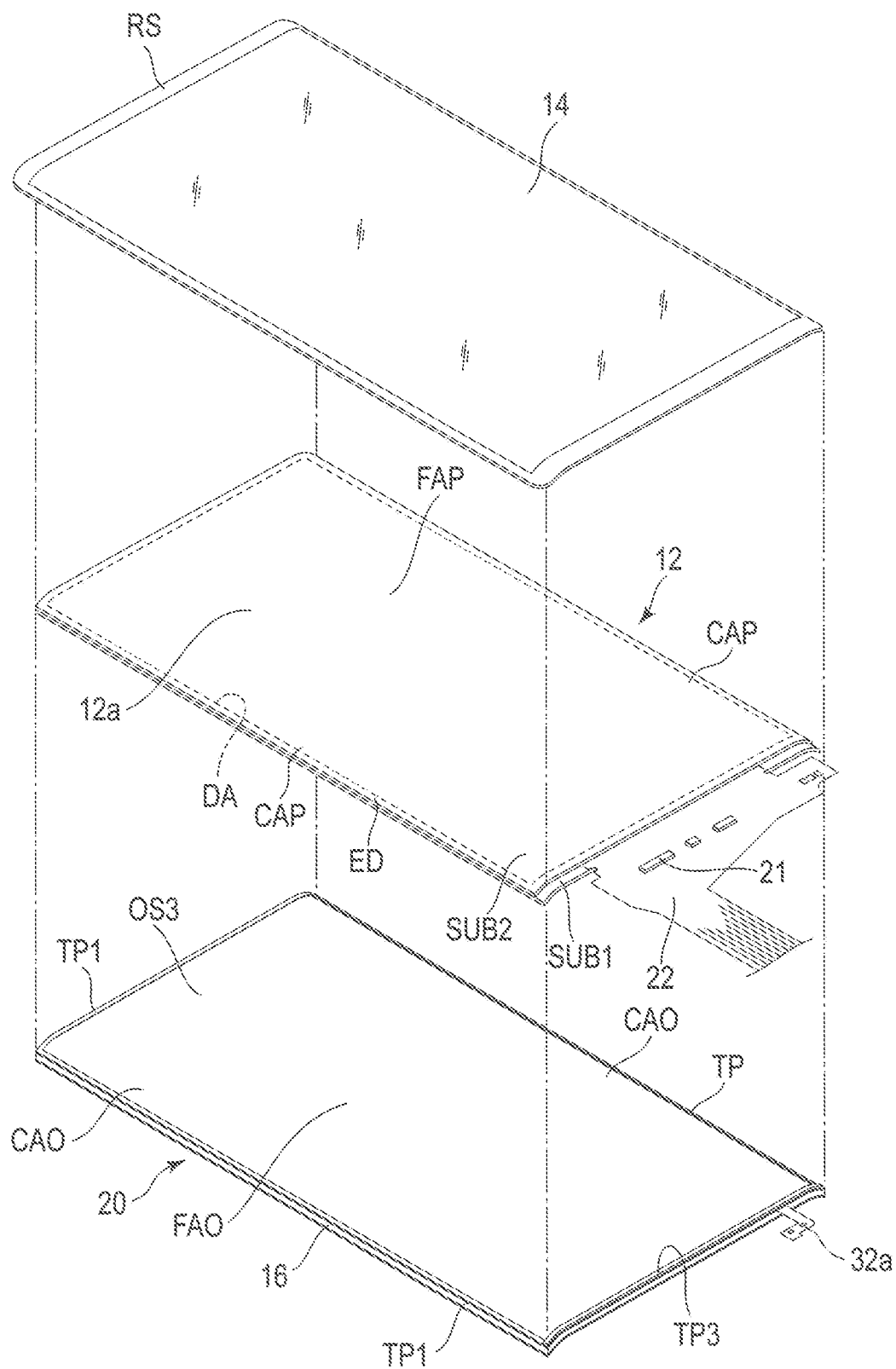
FIG. 2 is an exploded perspective view of the liquid crystal display device.

FIG. 1 is a perspective view showing a display surface side of a liquid crystal display device according to the first embodiment. FIG. 2 is an exploded perspective view of the liquid crystal display device.

A liquid crystal display device 10 can be incorporated into various electronic devices, for example, a smartphone, a tablet computer, a mobile phone, a notebook computer, a portable game console, an electronic dictionary, a television set, and a vehicle navigation system, to be used.

As shown in FIGS. 1 and 2, the liquid crystal display device 10 comprises an active-matrix flat liquid crystal display panel (liquid crystal panel) 12, a cover panel 14 overlaid on a display surface 12a, which is one surface of the liquid crystal panel 12, so as to cover the entire display surface 12a and a backlight unit (backlight device) 20 opposing a rear surface of the liquid crystal panel 12, which is the other surface thereof. According to this embodiment, both longitudinal side edges of the liquid crystal display device 10 are inclined in an out-of-plane direction, e.g., towards the rear surface side of the liquid crystal display device 10 and form inclined regions (CAP, CAO), respectively.

Figure 4:
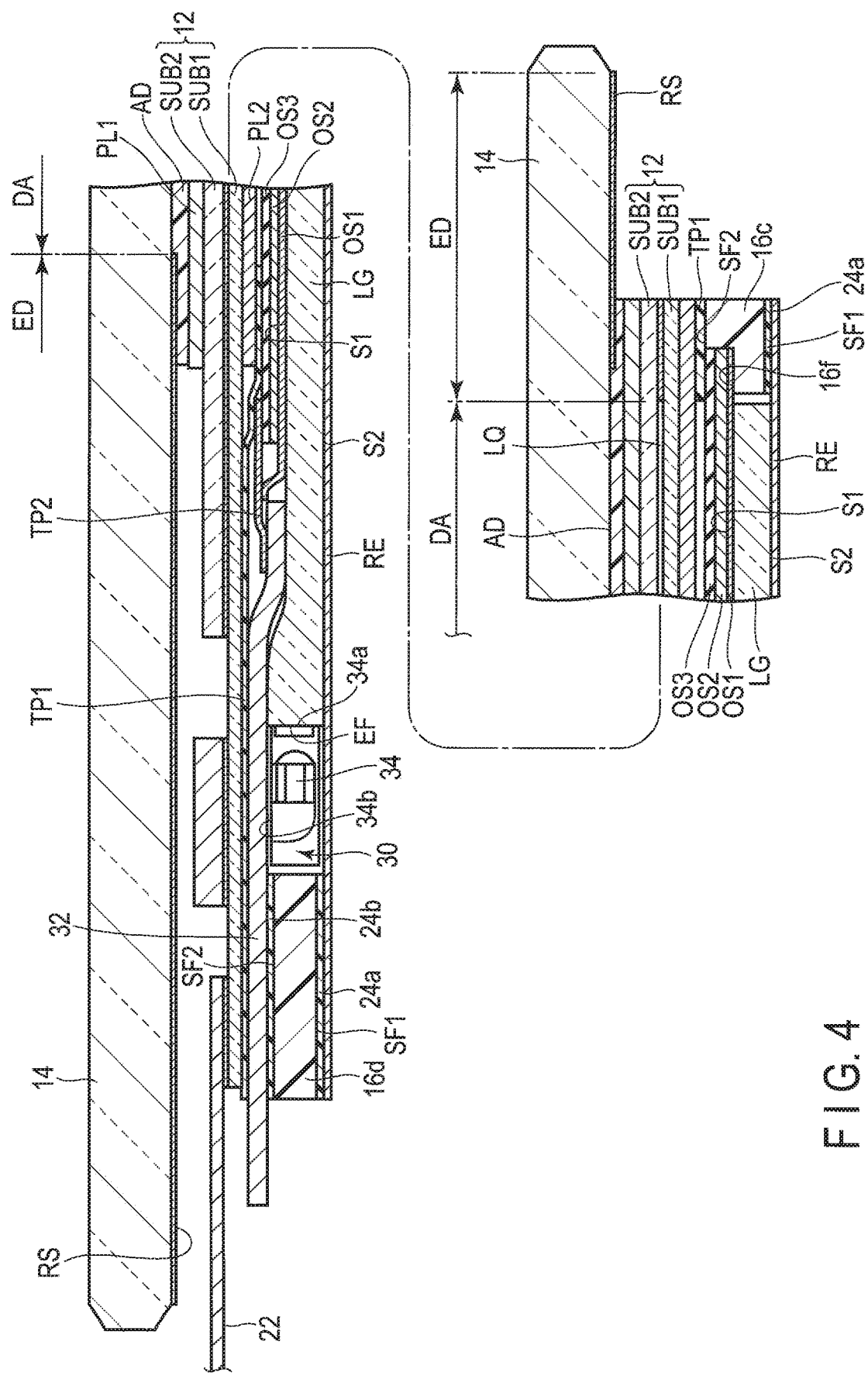
FIG. 4 is a cross-sectional view showing the liquid crystal display device taken along line A-A of FIG. 1.
Figure 5:
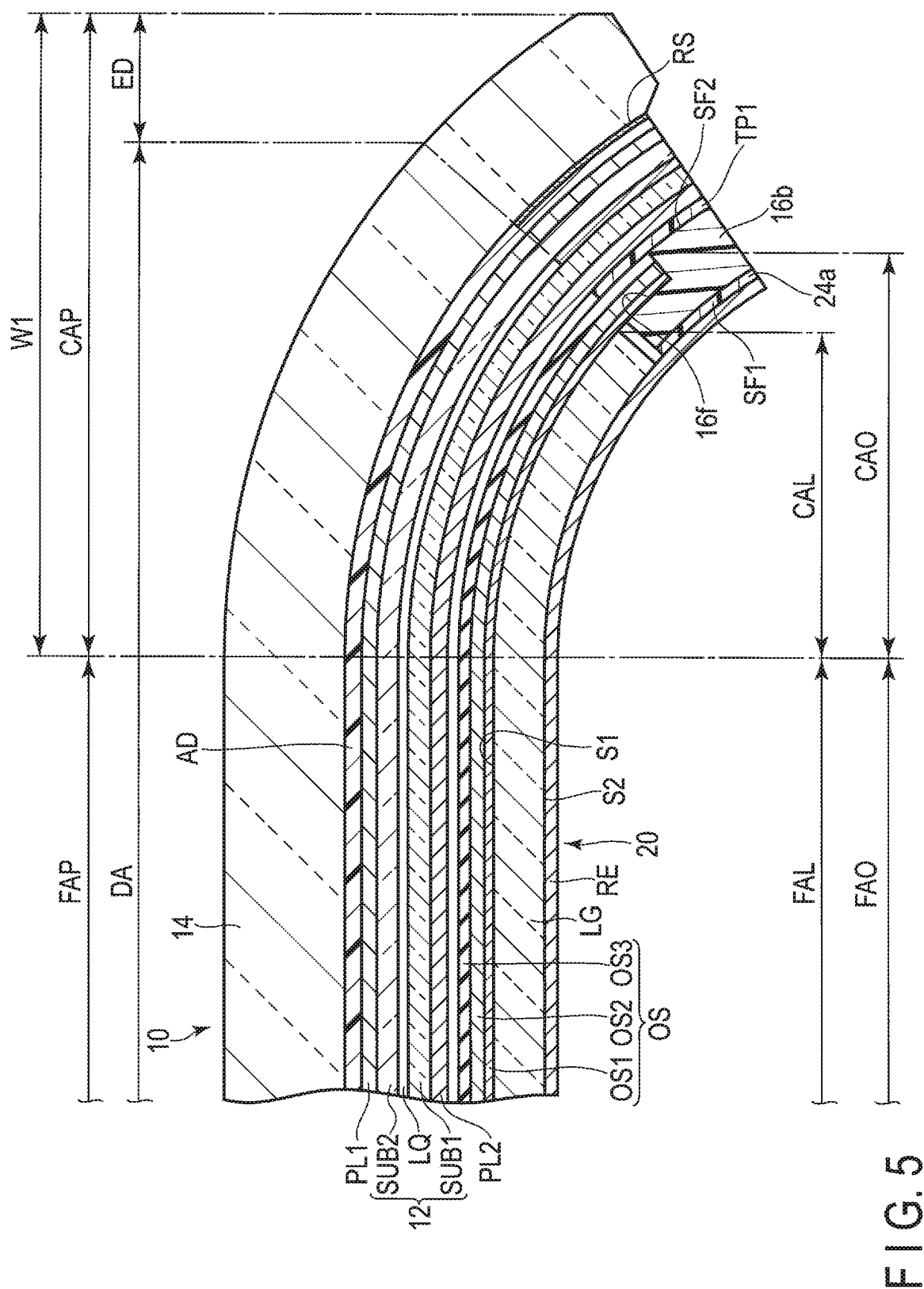
FIG. 5 is a cross sectional view showing a side edge portion of the liquid crystal display device taken along line B-B of FIG. 1.

FIG. 4 is a cross-sectional view showing the liquid crystal display device taken along line A-A in FIG. 1. FIG. 5 is a cross-sectional view showing the liquid crystal display device taken along line B-B in FIG. 1. As shown in FIGS. 2, 4 and 5, the liquid crystal display panel 12 includes a first substrate SUB1 of a rectangular shape, a second substrate SUB2 of a rectangular shape, opposing the first substrate SUB1 and a liquid crystal layer LQ provided between the first substrate SUB1 and the second substrate SUB2. The peripheral portion of the second substrate SUB2 is adhered to the first substrate SUB1 with a sealing member SE. On a surface of the second substrate SUB2, a polarizer PL1 is attached to form the display surface 12a of the liquid crystal panel 12. A polarizer PL2 is attached on a surface (a rear surface of the liquid crystal panel 12) of the first substrate SUB1.

In the liquid crystal panel 12, a substantially rectangular display area (active area) DA is provided in a region on an inner side surrounded by the sealing material SE in plan view with respect to the display surface 12a (in a state where the liquid crystal panel is viewed from a normal direction perpendicular to the surface of a central portion of the longitudinal direction of the liquid crystal panel), and images are displayed on the display area DA. Around the display area DA, a rectangular frame area (non-display area) ED is provided.

As shown in FIGS. 2 and 5, in the example illustrated, the liquid crystal panel 12 has such a shape that both longitudinal side edges are inclined (curved) towards the rear surface side (in an out-of-plane direction). That is, the liquid crystal panel 12 comprises a rectangular panel flat area FAP and a pair of panel inclined areas CAP extending while inclined towards the rear surface from both sides of the flat area FAP towards a longitudinal end of the liquid crystal panel 12. The panel inclined areas CAP may be linearly inclined or curvedly inclined in an arc shape. In this embodiment, each panel inclined area CAP is curved. Therefore, the panel inclined areas CAP will be referred to as panel curved hereinafter. A width W1 of each panel curve area CAP is more set to, for example, about 3 to 10 mm, preferably, 5 to 8 mm. The degree of curvature of the panel curved areas CAP, for example, the radius of curvature, can be adjusted arbitrarily.

In the example illustrated, a flexible printed circuit board (FPC) 23 is joined to a short edge-side end of the first substrate SUB1. A semiconductor device such as a drive IC chip 21 is mounted on the FPC 22. The drive IC chip 21 supplies a signal required to drive the liquid crystal panel 12.

As shown in FIGS. 1, 2, 4 and 5, the cover panel 14 is formed, for example, from a glass plate or an acrylic transparent resin, into substantially a rectangular shape. The cover panel 14 has a width and a length greater than dimensions (width and length) of the liquid crystal panel 12. A frame-shaped light-shielding layer RS is formed on the peripheral portion of the cover panel 14. In the cover panel 14, a region other than the region which opposes the display area DA is shielded by the light-shielding layer RS.

For example, both longitudinal ends of the cover panel 14 are formed to be curved towards the backlight device 20 in advance according to the panel curve area CAP of the liquid crystal panel 12. The back (rear surface) of the cover panel 14 is attached onto the polarizer PL1 of the liquid crystal panel 12 with a light-transmissive adhesives or tackiness agent, for example, an adhesive sheet AD made from an optical transparent resin.

The cover panel 14 covers an entire surface of the display surface 12a of the liquid crystal panel 12. The flat area FA of the cover panel 14 covers the panel flat area FAP of the liquid crystal panel 12 and both curved areas cover the panel curved areas CAP of the liquid crystal panel 12, respectively. Thus, the curved areas of the cover panel 14 are inclined (curved) along both respective longitudinal ends of the liquid crystal panel 12 in an out-of-plane direction.

In this embodiment, the both longitudinal ends of the cover panel 14 extend to a position slightly exceeding the both longitudinal ends of the liquid crystal panel 12. Shorter side edges of the cover panel 14 project outward from the respective short sides of the liquid crystal panel 12. In this embodiment, the interval between a longer side of the cover panel 14 and a respective longer side of the liquid crystal panel 12, i.e., the width of the longitudinal peripheral portion of the cover panel 14 is less the interval between a short side of the cover panel 14 and a respective short side of the liquid crystal panel 12, i.e., the width of the shorter-side peripheral portion of the cover panel.

Figure 3:
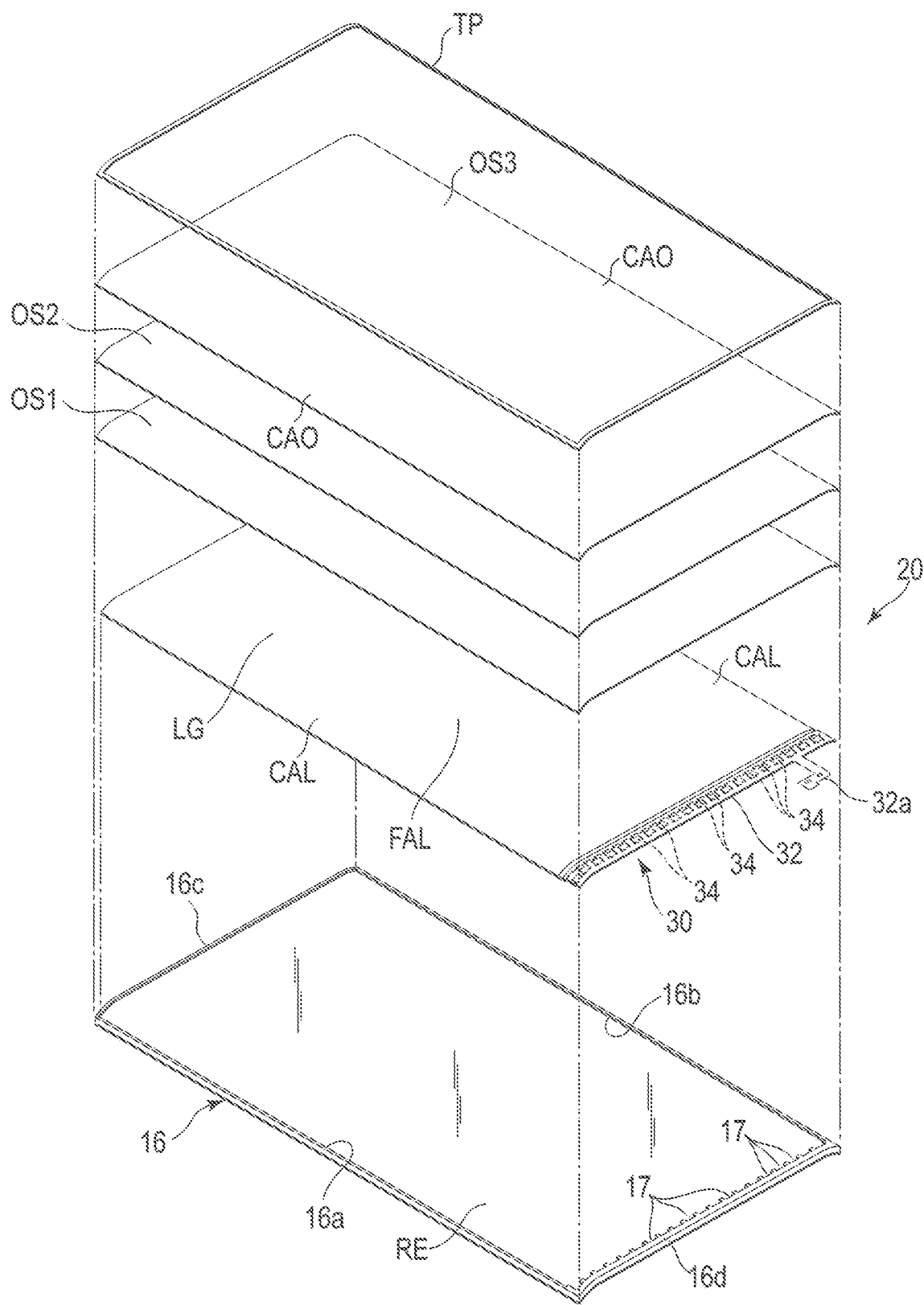
FIG. 3 is an exploded perspective view of a backlight device of the liquid crystal display device.

FIG. 3 is an exploded perspective view showing a backlight unit 20 shown in FIG. 1. As shown in FIGS. 2 to 5, the backlight unit 20 comprises a rectangular frame 16, a reflective sheet RE attached onto a first surface SF1 of the frame 16, a plurality of optical members arranged on the frame 16 and a light source unit 30 which supplies light entering the optical members.

The frame 16 is formed by, for example, molding a synthetic resin such as polycarbonate. The frame 16 includes a pair of long edge portions 16a and 16b opposing each other, and a pair of side edge portions 16c and 16d opposing each other. Outer dimensions of the frame 16 are substantially equal to those of the liquid crystal panel 12. Further, both ends of the short side portions 16c and 16d of the frame 16 are curved along the panel curved areas CAP of the liquid crystal panel 12.

As shown in FIGS. 4 and 5, the frame 16 comprises a second surface (upper surface) SF2 on a liquid crystal panel 12 side and a first surface (lower surface) SF1 on an opposite side to the second surface SF2. The frame 16 comprises a stepped portion 16f formed one step lower on an inner circumference side of the second surface SF2. In this embodiment, the stepped section 16f is formed on a pair of long side portions 16a and 16b and a short side portion c except for a short side portion 16d on a light source side. A difference (depth) in level of the stepped portion 16f is approximate the same as a total in thickness of three optical sheets OS1, OS2 and OS3, which will be described later. A plurality of recesses 17 are formed in an inner edge of the short side portion 16d on the light source side.

The reflective sheet RE is attached to the first side SF1 of the frame 16 with a double-sided tape 24a, so as to cover the lower surface side of the frame 16. The reflective sheet RE has a thickness of 200 μm or less, preferably, 50 to 90 μm and a reflectivity of 90% or more, preferably, 95% or more.

As shown in FIGS. 3 to 5, the backlight unit 20 includes, as optical members arranged in the frame 16, a rectangular light guide LG and a plurality of, for example, three sheets, a first optical sheet OS1, a second optical sheet OS2 and a third optical sheet OS3 overlaid on the light guide LG in plan view. Further, the backlight unit 20 comprises a light source unit 30 provided along one side surface (incident surface) EF of the light guide LG, so as to emit light towards the light guide LG. The number of optical sheets is not limited to three, but four or more or two or less.

The light guide LG is formed, for example, from a resin transparent with light-transmissivity, such as acrylics or polycarbonate into substantially a rectangular plate-like shape. The light guide LG includes a first main surface (upper surface) S1 serving as an emission surface, a second main surface (lower surface) S2 on an opposite side to the first main surface S1, and a plurality of side surfaces. In this embodiment, one side surface on a short-side portion side of the light guide LG is an incidence surface EF.

In this embodiment, side edge portions on a long-side portion side of the light guide LG are formed to be inclined (curved) towards the rear surface side. That is, the light guide LG includes a rectangular flat area FAL at a center and curved areas CAL on both side edge sides which are inclined in an out-of-plane direction. The curved areas CAL are curved to respectively follow the panel curved areas CAP of the liquid crystal panel 12, described above. The light guide LG is disposed in the frame 16 in such a manner that the second main surface S2 thereof opposes the reflective sheet RE.

As shown in FIGS. 3 and 4, the light source unit 30 comprises a belt-shaped printed circuit board (FPC) 32 and a light source mounted on the printed circuit board 32. According to this embodiment, for example, light-emitting diodes (LEDs) 34 each being a point light source are arranged at predetermined intervals and used as light sources. Each of the LEDs 34 comprises an emission surface 34a and a mounting surface 34b perpendicular to the emission surface 34a. The LEDs 34 are arranged at predetermined intervals along a longitudinal direction of the printed circuit board 32 (a direction parallel to the short side portion 16d of the frame 16). The mounting surface 34b of each LED 34 is mounted on the printed circuit board 32. Further, the printed circuit board 32 includes a connection end portion 32a extending from one side edge.

One long side portion of the printed circuit board 32 is attached to the short side portion 16d of the frame 16 by an adhesive member, for example, a double-sided tape 24b, and the other long side portion is located on an end portion on an incidence surface EF side of the light guide LG. Both longitudinal ends of the printed circuit board 32 may be curved respectively along the curved areas CAL of the light guide LG. Thus, the LEDs 34 are arranged between the short side portion 16d of the frame 16 and the incidence surface EF of the light guide LG in such a manner that the emission surfaces 34a of the LEDs 34 oppose the incidence surface EF. In this embodiment, the LEDs 34 are disposed respectively in recess portions 17 of the short side portion 16d.

Note that as the light source, a fluorescent tube or cathode-ray tube, which serves as a line light source, are also adoptable. Or a line light source or plane light source in which organic EL light sources, micro LEDs, and the like are arranged at very high precision may be adopted as the light source.

As shown in FIGS. 3, 4 and 5, according to this embodiment, a light-transmissive first diffusion sheet formed from, for example, a synthetic resin such as polyethylene terephthalate, a prism sheet and a second diffusion sheet (upper diffusion sheet) are employed as the first optical sheet OS1, the second optical sheet OS2 and the third optical sheet OS3, respectively. Each of the optical sheets OS1, OS2 and OS3 is formed to be slightly larger in width than the light guide LG and also slightly shorter in length than the light guide LG. The optical sheets OS1, OS2 and OS3 are formed slightly larger in dimensions than the display area DA of the liquid crystal panel 12.

The optical sheets OS1, OS2 and OS3 are stacked one on another in order on the first main surface S1 of the light guide LG. At least three side edges excluding the light source-side side edge of each of the optical sheet OS1, OS2 and OS3 are placed on the stepped portion 16f of the holding frame 16.

As shown in FIGS. 3 and 5, both side edges on the long-side portion side of the optical sheets OS1, OS2 and OS3 are curved along the curved areas CAL of the light guide LG. That is, each of optical sheets OS1, OS2 and OS3 includes a substantially rectangular diffusion flat area FAO disposed on the flat area FAL of the light guide LG and a diffusion curve area CAO located on both sides of the diffusion flat area FAO along its width direction.

The optical sheets OS1, OS2 and OS3 may be each formed to include a pair of diffusion curves areas CAO by placing an optical sheet formed flat, along the first main surface S1 of the light guide LG, or may be molded by bending both side edge portions on the long side-portion side in advance.

A frame-shaped adhesive member, for example, double-sided tape TP1, is attached onto the second surface SF2 of the frame 16. The double-sided tape TP1 is partially attached onto a peripheral portion of the third optical sheet OS3 in a pair of the long side portions 16a and 16b and one short side portion 16d excluding the short side portion 16c on the light source side. Thus, the third optical sheet OS3 is maintained in a predetermined position while both side edge portions are curved.

As shown in FIG. 4, an adhesive member, for example, a double-sided tape TP2 is attached onto the end portion on the light source side of the third optical sheet OS3 over to the end portion on an optical-sheet side of the printed circuit board 32. Further, one end portion on the light source side of the first optical sheet OS1, which is the lowermost portion, extends towards the light source over end portions of the second and third optical sheets OS2, and is attached to the double-sided tape TP2. Thus, the optical sheet OS1 and OS3 are bonded to the printed circuit board 32 by the double-sided tape TP2. Further, in the short side portion 16d on the light source side, the double-sided tape TP1 is attached to overlay on the short side portion 16d, the printed circuit board 32 and the end portion of the third optical sheet OS3.

As shown in FIGS. 4 and 5, the backlight unit 20 is disposed to oppose the rear surface of the liquid crystal panel 12 and is attached to the polarizer PL2 and the first substrate SUB1 by the double-sided tape TP1. In other words, a pair of long side portions 16a and 16b of the frame 16 are attached respectively to the long-side end portion of the rear surface of the polarizer PL2 by the double-sided tape TP1 so as to be placed respectively along the long sides of the polarizer PL2. The short side portion 16c of the frame 16 is attached to the short-side end portion of the rear surface of the polarizer PL2 by the double-sided tape TP1 so as to be placed along the short side of the polarizer PL2.

The short side portion 16d of the frame 16 and the printed circuit board 32 are attached to the rear surface of the first insulating substrate SUB1 by the double-sided tape TP1. Thus, the short side portion 16d of the frame 16 and the light source unit 30 are located to overlap the frame area ED of the liquid crystal panel 12 and the light-shielding layer RS of the cover panel 14.

The diffusion flat area FAO of the backlight unit 20 opposes the panel flat area FAP of the liquid crystal panel 12, and the diffusion curve areas CAO on both sides oppose the panel curved areas CAP of the liquid crystal panel 12, respectively. The third optical sheet OS3 opposes the rear surface of the liquid crystal panel 12 with a slight gap therebetween. Thus, the first, second and third optical sheet OS1, OS2 and OS3 oppose the entire display area DA of the liquid crystal panel 12.

The printed circuit board 32 of the light source unit 30 is connected to the FPC 22 via the connection end portion 32a (see FIG. 2). Drive current is allowed to flow to the LEDs 34 through the FPC 22 and the printed circuit board 32. The light emitted from the LEDs 34 enters the light guide LG from the incidence surface EF thereof, propagates in the light guide LG and is emitted towards the liquid crystal panel 12 from the first main surface (emission surface) S1. The emitted light is diffused and converged by the first, second and third optical sheets OS1, OS2 and OS3, and then irradiated onto the display area DA of the liquid crystal panel 12.

Figure 6:
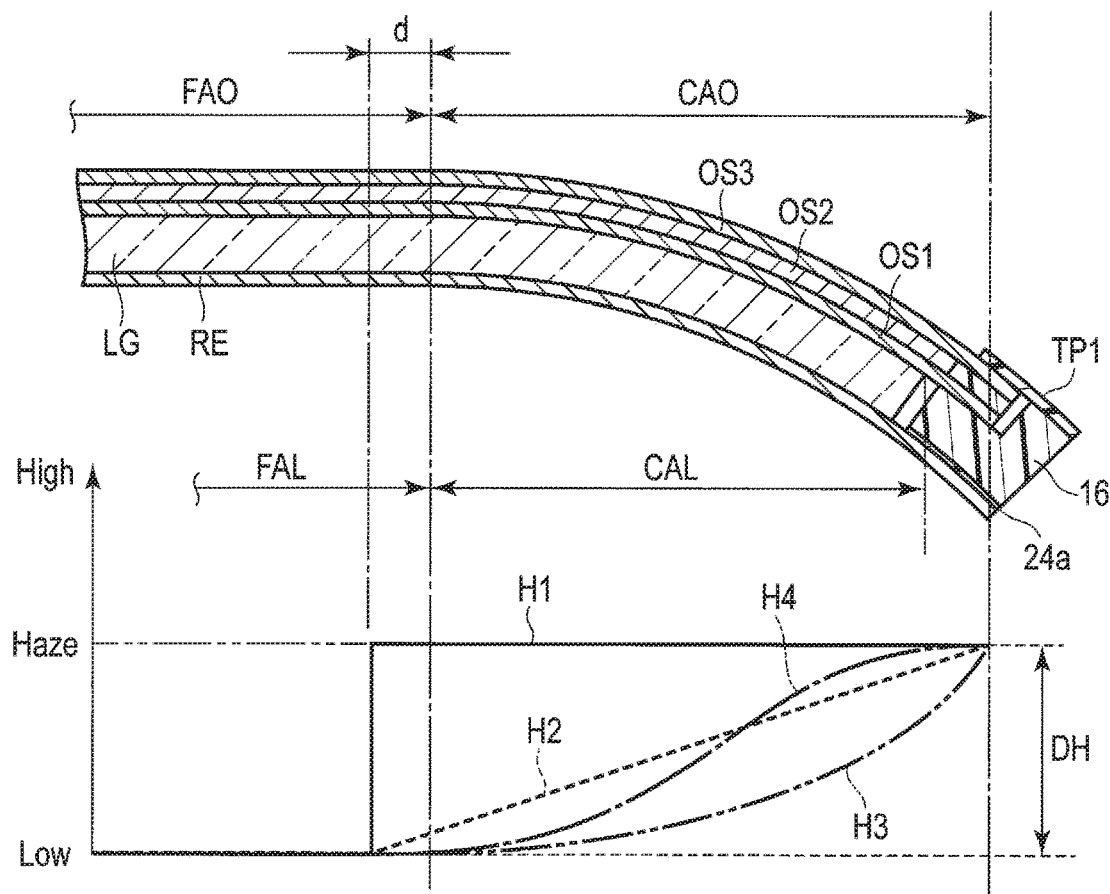
FIG. 6 is a diagram showing haze in each of a flat region and a curve region of the backlight device.
Figure 7:
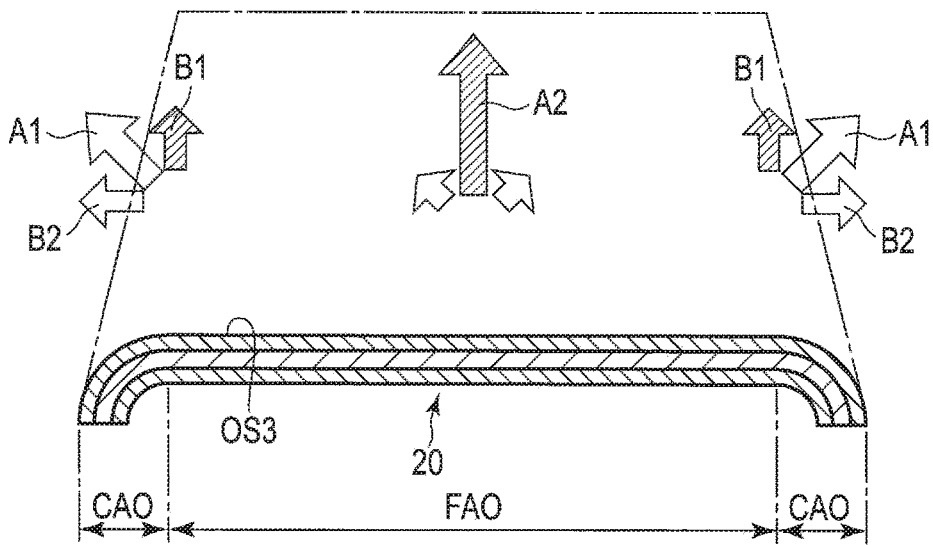
FIG. 7 is a diagram schematically showing luminance distribution of light emitted from the backlight device.

Next, the structure of the backlight unit 20, especially the configuration of the optical sheets, will be described in further detail. FIG. 6 is a diagram illustrating the change in haze in the flat area and curved areas of the backlight unit and FIG. 7 is a diagram schematically showing an irradiation state of the backlight unit.

As shown in FIG. 6, in the backlight unit 20, at least one optical sheet, here, the third optical sheet (optical diffusion sheet) OS3 is configured so that the haze differs between the diffusion flat area FAO and the diffusion curve areas CAO. That is, the third optical sheet OS3 is formed so that the haze of the diffusion flat area FAO is higher than that of the diffusion curve area CAO.

In this embodiment, the ratio of diffusion transmissivity to total ray transmissivity (diffusion transmissivity/total ray transmissivity) is indicated by an index of haze (%). As the transparent material is cloudier, the haze is higher, and for example, the PET film has a haze of about 4% and glass has a haze of 0%.

For example, the diffusion flat area FAO of the third optical sheet OS3 has a haze of 10% or less and the diffusion curve areas CAO have a haze of 50% or higher. The maximum haze of the diffusion curve area CAO should desirably be 10% or more higher than the haze of the diffusion flat area FAO.

As indicated by a characteristic line H1 shown in FIG. 6, the diffusion curve areas CAO may be formed to have a uniform haze. Further, as indicated by a characteristic line H2 in FIG. 6, the diffusion curve areas CAO may be formed so that the haze gradually increases from the boundary between the diffusion flat area FAO and each diffusion curve area CAO to the side edge (distal edge) of the diffusion curve area CAO. It is preferable that the highest haze at the distal edge of the diffusion curve area CAO should be 10% or more higher than the haze of the diffusion flat area FAO (the haze difference DH 10%).

When gradually increasing the haze, that is, imparting a gradation, it is not limit to the case where the haze increases linearly as indicated by the characteristic line H2. For example, as indicated by the characteristic line H3 in FIG. 6, it may be structured to increase the haze from the diffusion flat area FAO so as to draw a parabolic line. Further, the variation rate and the inclination of the haze may not be limited to be constant. For example, as indicated by a characteristic line H4, the haze may be increased by high variation rate and inclination from the diffusion flat areas FOA and then by a low variation rate or inclination in the middle.

When imparting a gradation to the haze, it is preferable that the gradation starts from the position located on a diffusion flat area FAO side by a distance d, for example, 0.2 mm or more, from the boundary between the diffusion flat area FAO and the diffusion curve area CAO. With the structure, the transmissivity in a part of the diffusion flat area FAO along the boundary is slightly lower than that in another part of the diffusion flat area FAO. Further, the gradation of the haze may be started from inside of the diffusion curve area CAO depending on the degree of curvature of the diffusion curve area CAO.

The haze of the third optical sheet OS3 can be adjusted by the following method. For example, the haze can be changed by applying a paint containing transparent beads onto at least one surface of the optical sheet and adjusting the density of the beads. As the density of the beads disposed is higher, the haze is higher.

Alternatively, the haze can be changed with photolithographic method, by forming fine projections and recesses on the surface of an optical sheet and adjusting the density of the projections and recesses. For example, the surface of the diffusion flat area FAO is formed flat without projections and recesses, whereas the surface of the diffusion curve area CAO is formed to comprise projections and recesses. The gradation of haze can be imparted by increasing the density of the projections and recesses from near the boundary toward the distal edge of the diffusion curve area CAO. The projections and recesses may be formed on not only one of the surfaces of the optical sheet but both surfaces.

Usually, a backlight unit is a flat over an entire surface and is optically designed to be a uniform luminance over an entire surface of a plate-shaped sheet. When a long side end of the liquid crystal display device including such a conventional backlight is curved, the flat area FA tends to be bright whereas the curve area (inclined area) CA tends to be dark when viewing such a liquid crystal display device in plan view.

On the other hand, according to this embodiment, the haze of the diffusion curve area CAO of the third optical sheet (optical diffusion sheet) OS3 is set higher than haze of the diffusion flat area FAO, and with this configuration, the light passing through the diffusion curve area CAO can be diffused at higher intensity as shown in FIG. 7. That is, in the diffusion curve area CAO, the transmission of the light (indicated by arrow A1 in FIG. 7) to the normal direction in each position of the diffusion curve area CAO is suppressed, whereas the diffusion of the light (indicated by arrows B1 and B2 in FIG. 7) is increased in directions other than the normal direction. As a result, in the diffusion curve area CAO as well, the diffusion of the light (arrow B1) to the front direction of the diffusion flat area FAO is increased and the front-direction luminance is increased in the diffusion curve area CAO as well. Note that in the diffusion flat area FAO, the light (indicated by arrow A2 in FIG. 7) to the normal direction is the light to the front direction. Thus, the difference between the front-direction luminance of the diffusion flat area FAO and the front-direction luminance of the diffusion curve area CAO (a front-direction luminance difference) is decreased to improve the appearance of the image on the display surface 12a when it is seen straight forwardly. At the same time, even when the display surface 12a is viewed from an oblique direction, the luminance difference between the flat area FA and the curve area CA of the liquid crystal display device 10 can be decreased.

With the backlight unit 20 and the liquid crystal display device 10 of this embodiment configured as above, the luminance difference of the front-direction luminance of the flat area and the front-direction luminance of the inclined area can be decreased while suppressing the decrease in luminance of the flat area. Thus, a backlight unit and a liquid crystal display device, in which high luminance is uniformly maintained over the entire area of the display surface to improve the display quality, can be obtained.

Next, a backlight unit and a liquid crystal display device devices according to another embodiment will be described. In another embodiment provided below, the identical parts to those of the first embodiment mentioned above will be denoted by the same reference numbers, and detailed explanations therefor will be omitted or abridged. Different parts from those of the first embodiment will be mainly described in detail.

Second Embodiment

Figure 8:
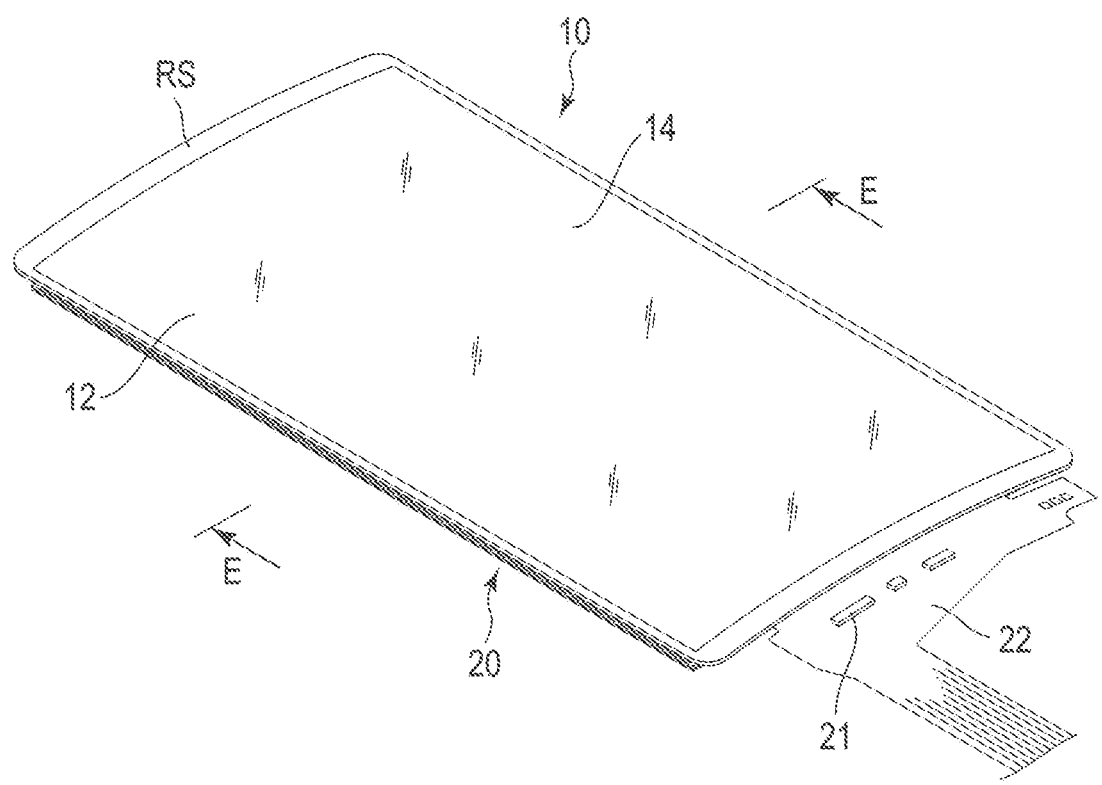
FIG. 8 is a perspective view showing a liquid crystal display device of the second embodiment from a display surface side.
Figure 9:
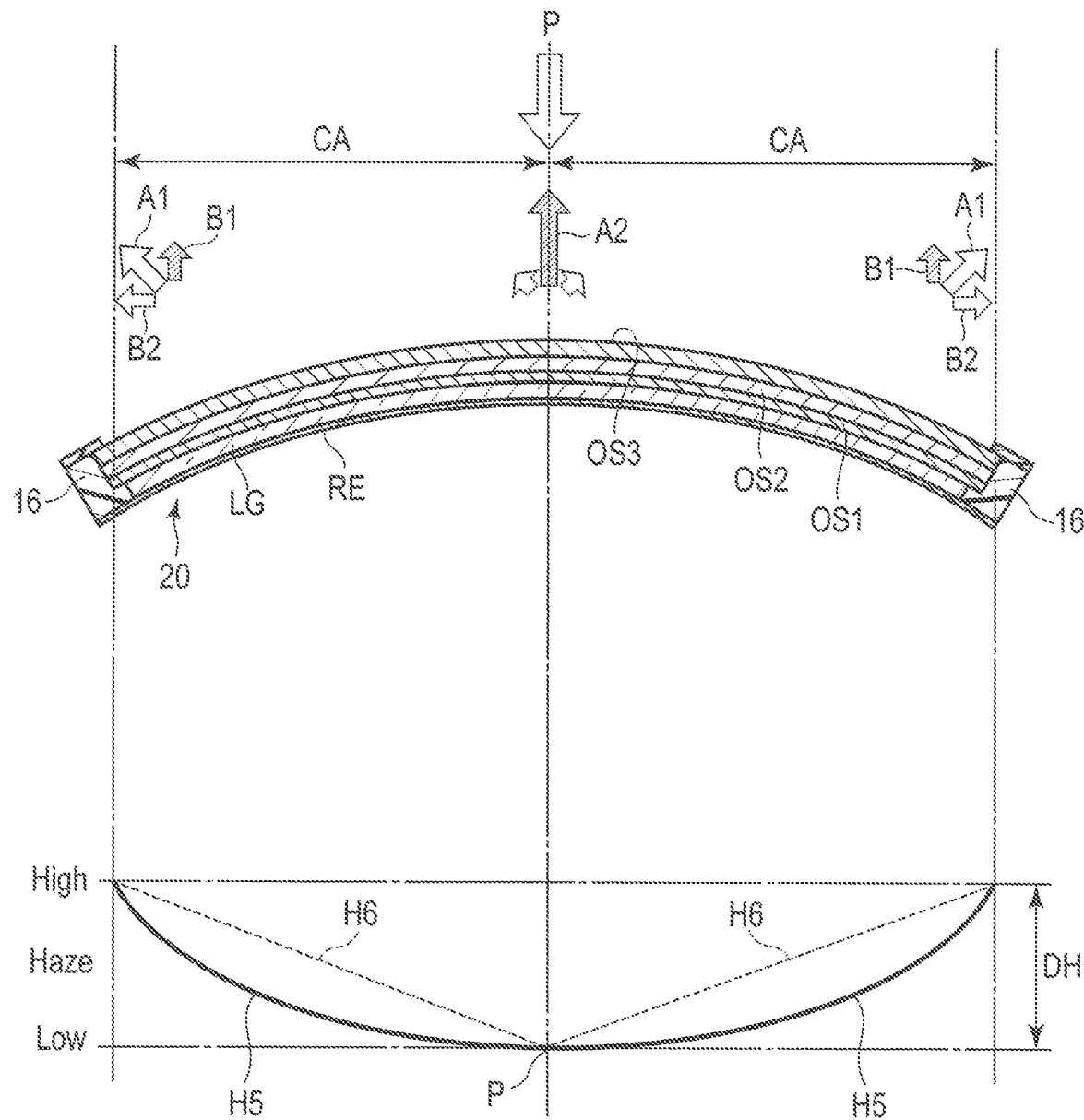
FIG. 9 is a diagram schematically showing a cross section of a backlight device of the second embodiment taken along line E-E in FIG. 8 and haze distribution.

FIG. 8 is a perspective view showing a liquid crystal display device of a second embodiment from a display surface side. FIG. 9 is a diagram schematically showing a cross section of a backlight device of the second embodiment taken along line E-E in FIG. 8 and the haze distribution of the backlight device.

As shown in FIG. 8, according to this embodiment, a liquid crystal panel 12 and a cover panel 14 of a liquid crystal display device 10 do not comprise a flat area, and their entire bodies are inclined in an arc manner curved. In this embodiment, the liquid crystal display device 10 is formed to comprise a pair of straight long sides and a pair of short sides curved in an arc manner. That is, the liquid crystal panel 12 and the cover panel 14 are formed straight in the longitudinal direction and curved in an arc manner in the width direction (curved in an out-of-plane direction) to project out so that its central portion of the respective side serves as its apex. The degree of curvature, for example, the radius of curvature, can be adjusted arbitrarily. Moreover, the radius of curvature may be constant, or the radius of curvature may be set to decrease as approaching the both side edges.

As shown in FIG. 9, a light guide LG and optical sheets OS1, OS2 and OS3 of the backlight unit 20 are curved, in accordance with the curve of the liquid crystal panel 12, in the out-of-plane direction, so that its central portion in the width direction projects to serve as its apex. That is, the backlight device 20 comprises the curve area CA on each of the right and left sides with respect to the central portion at its center along the width direction. The backlight unit 20 is attached to the liquid crystal panel 12 in the state where the third optical sheet OS3 faces the rear surface of the liquid crystal panel 12.

The backlight unit 20 is formed so that in at least one sheet, here, the third optical sheet (optical diffusion sheet) OS3, the haze of the curve area (diffusion curve area) CA is higher than the haze of the central portion in the width direction, which is a viewpoint center P. For example, the haze of the central portion of the third optical sheet OS3 in the width direction is 10% or less and the haze of the curve area CA is 50% or higher. The maximum haze of the curve area CA should preferably be 10% or more higher than the haze of the central portion.

As indicated by characteristic lines H5 and H6 shown in FIG. 9, the haze of the curve area CA may rise gradually from the central portion along the width direction towards the side edge (distal edge) on a respective long-side side. It is preferable that the haze is at the highest on both sides edges of the third optical sheet OS3 and the highest haze is 10% or more higher than the haze of the central portion (the haze difference DH≥10%).

When the haze is raised gradually, that is, imparting gradation, it is not limited to only the configuration in which the haze increases linearly as indicated by the characteristic line H6, but such configuration is adoptable as well, in which the haze increases two dimensionally to describe a parabola as indicated by the characteristic line H5, or increases to change its variation rate or inclination in the middle. The third optical sheet OS3 is formed to have arbitrary haze distribution by, for example, adjusting the density of the projections and recesses formed by the photolithographic method as in the first embodiment.

When the third optical sheet OS3 is formed to have the above-described haze distribution, the light which passes through curve area CA diffuses at higher intensity as indicated by an arrow in FIG. 9. That is, in the curve area CA, the transmission of the light (indicated by arrow A1 shown in FIG. 9) to the normal direction in each position of the curve area CA is suppressed, whereas diffusion of the light (indicated by arrows B1 and B2 show in FIG. 7) to directions other than the normal direction increases. As a result, in each curve area CA as well, the diffusion of the light (arrow B1) to the front direction and the front-direction luminance rises. Note that in the central portion of the third optical sheet OS3 along the width direction, the light (the arrow A2 shown in FIG. 9) in the correction direction is set into the light to the front direction. Thus, when the liquid crystal panel 12 and the backlight unit 20 are viewed in plan view, the difference between the front-direction luminance of the central portion along the width direction diffusion, which is the viewpoint center P and the front-direction luminance of the curve areas CAO (the front-direction luminance difference) is decreased to improve the appearance of the display surface. At the same time, even when the display surface is viewed from an oblique direction, the luminance difference between the central portion and the curve area CA can be decreased.

In the second embodiment, the other structures of the backlight unit and the liquid crystal display device are the same as those of the backlight unit and the liquid crystal display device according to the first embodiment described above.

As described above, with the backlight unit 20 and the liquid crystal display device 10 according to the second embodiment, the luminance difference between the central portion and each curve area can be decreased to reduce the luminance difference in the front direction over the entire area of the display surface. Thus, a backlight device and a liquid crystal display device with improved display quality can be obtained.

In the second embodiment, the liquid crystal panel and the backlight unit are configured to be curved in the width direction, but the configuration is not limited only to this. But the liquid crystal panel and the backlight unit may be configured to be curved in the longitudinal direction. Moreover, its curvature is not limited to project out in the front direction, but may project to the rear surface direction, which is a structure curved to recess to the front direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Based on the structures which have been described in the above-described embodiments, a person having ordinary skill in the art may achieve a structure with an arbitral design change; however, as long as they fall within the scope and spirit of the present invention, such a structure is encompassed by the scope of the present invention. For example, the outer shape and inner shape of the frame of each of the backlight unit and the liquid crystal panel is not limited to rectangular, but one or both of the outer shape and inner shape may be in some other shape, for example, polygonal, circular, elliptical or a combination of any of these. The materials of the structural members of the liquid crystal panel and the backlight unit are not limited to those of the examples provided above, but may be selected from various options.

Furthermore, regarding the present embodiments, any advantage and effect those will be obvious from the description of the specification or arbitrarily conceived by a skilled person are naturally considered achievable by the present invention.

What is claimed is:

1. A backlight device comprising:
a light guide comprising an emission surface including a flat area, and an inclined area inclined in an out-of-plane direction from an edge of the flat area, and an incident surface;
a light source which emits light entering the incident surface of the light guide; and
an optical diffusion member provided on the emission surface of the light guide, the optical diffusion member including a first optical diffusion sheet, a second optical diffusion sheet, and a prism sheet between the first optical diffusion sheet and the second optical diffusion sheet;
wherein the first optical diffusion sheet comprises:
a first diffusion flat area that overlaps the flat area of the emission surface, and
a first diffusion inclined area that overlaps the inclined area of the emission surface,
the second optical diffusion sheet comprises:
a second diffusion flat area that overlaps the flat area of the emission surface, and
a second diffusion inclined area that overlaps the inclined area of the emission surface,
wherein a haze of the first diffusion inclined area is the same as a haze of the first diffusion flat area, and a haze of the second diffusion inclined area is higher than a haze of the second diffusion flat area.

2. The backlight device of claim 1, wherein
a maximum haze in the second diffusion inclined area is 10% or more higher than the haze in the second diffusion flat area.

3. The backlight device of claim 1, wherein the first diffusion inclined area and the second diffusion inclined area are curved.

4. The backlight device of claim 1, wherein
the emission surface, the first optical diffusion sheet, and the second optical diffusion sheet each comprises a pair of long sides and a pair of short sides, and
the emission surface and the first and second optical diffusion sheets each comprise the flat area and the first and second flat areas which are located in a central portion, and the inclined area and the first and second diffusion inclined areas each located on sides of respective long sides of the flat area and the first and second diffusion flat areas.

5. The backlight device of claim 4, wherein
the second diffusion inclined area is wider than the first diffusion inclined area.

6. The backlight device of claim 5, further comprising
a frame provided along the long side of the light guide, an outer edge of the second diffusion inclined area of the second diffusion sheet is fixed on the frame.

7. The backlight device of claim 1, wherein
the incident surface of the light guide is perpendicular to the emission surface and provided at an end of the emission surface, and both of the flat area and the inclined area extend perpendicularly from an edge of the incident surface.

8. A liquid crystal display device comprising:
a liquid crystal panel comprising a panel flat area, a panel inclined area inclined to a rear surface side with respect to the panel flat area, and a display area provided across the panel flat area and the panel inclined area; and
a backlight device provided to oppose a rear surface of the liquid crystal panel,
wherein the backlight device comprises:
a light guide comprising an emission surface including a flat area, and an inclined area inclined in an out-of-plane direction from an edge of the flat area, and an incident surface;
a light source which emits light entering the incident surface of the light guide; and
an optical diffusion member provided on the emission surface of the light guide, the optical diffusion member including a first optical diffusion sheet, a second optical diffusion sheet, and a prism sheet between the first optical diffusion sheet and the second optical diffusion sheet;
wherein the first optical diffusion sheet comprises:
a first diffusion flat area that overlaps the flat area of the emission surface, and
a first diffusion inclined area that overlaps the inclined area of the emission surface,
the second optical diffusion sheet comprises:
a second diffusion flat area that overlaps the flat area of the emission surface, and
a second diffusion inclined area that overlaps the inclined area of the emission surface,
wherein a haze of the first diffusion inclined area is the same as a haze of the first diffusion flat area, and a haze of the second diffusion inclined area is higher than a haze of the second diffusion flat area, and
the second diffusion flat area of the second optical diffusion sheet opposes the panel flat area and the second diffusion inclined area opposes the panel inclined area.

9. The liquid crystal display device of claim 8, wherein
a maximum haze in the second diffusion inclined area is 10% or more higher than the haze in the second diffusion flat area.

10. The liquid crystal display device of claim 8, wherein
the first diffusion inclined area and the second diffusion inclined area are curved.

11. The liquid crystal display device of claim 8, wherein
the emission surface, the first optical diffusion sheet, and the second optical diffusion sheet each comprises a pair of long sides and a pair of short sides, and
the emission surface and the first and second optical diffusion sheets each comprise the flat area and the first and second flat areas which are located in a central portion, and the inclined area and the first and second diffusion inclined areas each located on sides of respective long sides of the flat area and the first and second diffusion flat areas.

12. The liquid crystal display device of claim 11, wherein the second diffusion inclined area is wider than the first diffusion inclined area.

13. The liquid crystal display device of claim 12, further comprising
a frame provided along the long side of the light guide, an outer edge of the second diffusion inclined area of the second diffusion sheet is fixed on the frame.

14. The liquid crystal display device of claim 8, wherein the incident surface of the light guide is perpendicular to the emission surface and provided at an end of the emission surface, and both of the flat area and the inclined area extend perpendicularly from an edge of the incident surface.

* * * * *